S. G. DEWEY.
Water Wheels.
No. 124,727. 
Patented March 19, 1872.
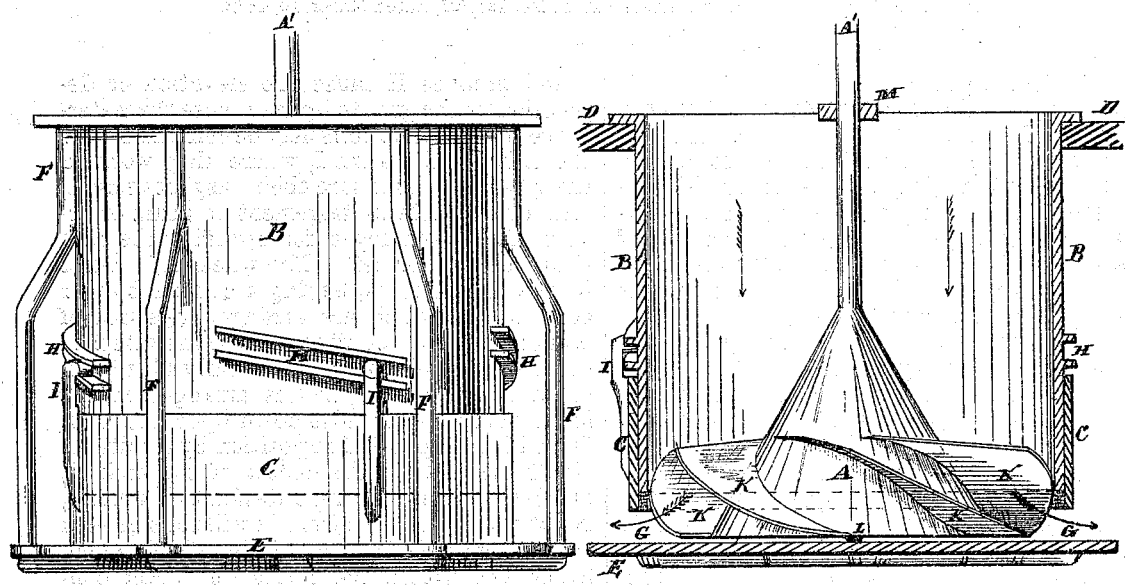
Fig. 2
Fig. 3
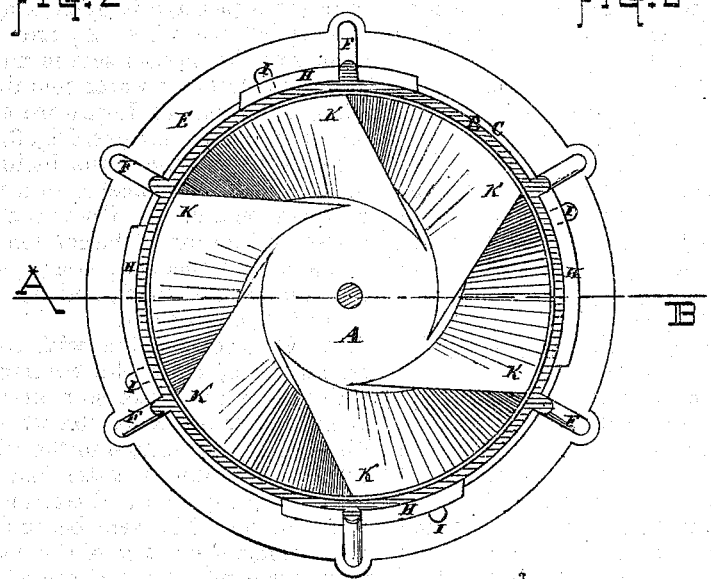
Fig. 1
Witnesses.
Thos. H. Dodge
A. E. Price
Inventor
Sylvester G. Dewey

UNITED STATES PATENT OFFICE.

SYLVESTER G. DEWEY, OF WESTFIELD, MASSACHUSETTS.

IMPROVEMENT IN WATER-WHEELS.

Specification forming part of Letters Patent No. 124,727, dated March 19, 1872.

*To all whom it may concern:*

Be it known that I, SYLVESTER G. DEWEY, of Westfield, in the county of Hampden and State of Massachusetts, have invented certain new and useful Improvements in Water-Wheels; and I do hereby declare the following to be a full, clear, and exact description of the same, reference being had to the accompanying drawing, which forms a part of this specification, and in which—

Figure 1 represents a plan view of a water-wheel embracing my improvements. Fig. 2 represents a side view of the same; and Fig. 3 represents a central vertical section of the curbing at line A B, Fig. 1.

The nature of my invention consists in certain improvements in the construction and relative arrangement of the wheel, gate, and curbing, as hereinafter described.

In the drawing, the parts marked A represent the wheel; B indicates the cylindrical curbing, and C the gate. The cylindrical curb B is of metal, and is arranged in an opening formed through the bottom of the flume D, the curb extending wholly below the flume-bottom, on which it is supported by means of a flange around its upper edge, or in some other suitable manner. A circular metallic disk or bed-plate, E, of greater diameter than the cylinder of the curb B, is arranged at a short distance below the lower end of the latter, and is supported in position by a series of bolts or rods, F, attached at intervals to its periphery, and having their upper ends properly secured to the upper part of the curbing. The disk E forms a projecting apron entirely around the bottom of the curb B, so that the water which flows through the space G between the curb and disk will pass out horizontally around the entire circumference of the disk. The gate C is made in the form of a ring, and is fitted closely to the outside of the cylinder of the curb at its lower end, as shown. The lower edge of the gate C is finished so as to fit squarely and tightly down upon the bottom disk E, and to thus stop the flow of water through the space G. Inclined grooves or ways H are formed on the outside of the curb B, and arms I project upward from the gate C, having their ends turned inward and working in said grooves H, and, by swinging the gate C around to the right or left, these arms I and grooves H cause the elevation or depression of the gate to open or close the water-space G. Friction-rolls may be combined with the ends of the arms I, where they work in the grooves H to insure their easy movement, and any suitable arrangement of gears or levers may be employed for swinging the gate C to the right or left. The wheel A is made in the form shown, having a conical hub or core, around which are arranged a series of diagonal blades or wings, K. This wheel is made of such diameter as to nearly fill the interior of the curb B, and is arranged in the lower part thereof, close down upon the disk E, and it is supported in position by a suitable step-bearing, L, at the center of the disk E, and by a bearing, M, upon its shaft or spindle, A', at the top of the curb. It will thus be seen that the gate C is back of the wheel, which latter sits within the column of water contained within the curb, and when the gate C is raised a passage is opened around the periphery of the wheel A, and the water escaping at the bottom sets in motion the entire vertical column of water contained within the curb, which passes downward and out in the direction of the arrows, Fig. 3, during which passage it acts upon the inclined blades K, and revolves the wheel A in a very rapid and powerful mannner. Upon the gate C being closed the motion of the column of water within the curb is checked; consequently it ceases to act upon the wheel, and the motion of the latter is thus stopped.

It will be noticed that with this relative arrangement of parts the column of water remains solid and unbroken until it impinges upon the blades K of the wheel; and if the wheel is properly fitted to the curb that no appreciable amount of water can pass through without acting upon and transmitting its force to the wheel. The vent being around the circumference, the action of the water is brought near to the periphery of the wheel, where its force will be exerted to the best advantage. It will also be seen that the water moves directly downward upon the wheel, thus combining the entire weight and velocity of the water-column to produce useful effect. The rods or bars F may be attached to the curbing by bolts, and their lower ends may be passed down through holes in the disk or bed-plate E, and provided with screw-threads on their lower ends to receive nuts whereby the bed-plate can be very accurately adjusted, so as to leave a uniform space between the bottom of the curbing and the bed-plate. Check-nuts may also be arranged upon the bars F, above the bed-plate E. The buckets K may be made to cover a greater portion of each other than is shown in the drawing, if preferred. The gate C may be operated by having a lever or arm attached thereto; or it may have mechanism combined therewith so that it can be operated from the room above the wheel.

Having described my improvements in water-wheels, what I claim therein as new and of my invention, and desire to secure by Letters Patent, is—

The combination, with the wheel A, of the curb B, bottom disk E, and gate C, constructed and arranged in relation to each other, substantially as shown and described.

SYLVESTER G. DEWEY.

Witnesses:
THOS. H. DODGE,
A. E. PEIRCE.